United States Patent Office.

J. ROEMHELD, OF CHICAGO, ILLINOIS.

Letters Patent No. 81,008, dated August 11, 1868.

IMPROVED EYE-WATER.

*The Schedule referred to in these Letters Patent and making part of the same.*

TO ALL WHOM IT MAY CONCERN:

Be it known that I, J. ROEMHELD, of Chicago, in the county of Cook, and State of Illinois, have invented a new and useful Improvement in Eye-Water or medical composition; and I do hereby declare that the following is a full, clear, and exact description thereof, which will enable others skilled in the art to make and use the same.

The invention relates to a new medical composition, to be used for curing sore, inflamed, and weak eyes.

The medicine is composed of the following ingredients, in about the proportion set forth:

To sixteen ounces of best quality of four years' old Rhine wine are used sixteen ounces of distilled water, one-half ounce of cloves, one-half ounce of sulphate of zinc, two sheets of writing-paper.

The paper shall be first burned on a porcelain or other enamelled dish or vessel. The oily matter which is separated from the paper by combustion, and which remains on the plate, is dissolved in the wine, by pouring the wine into the dish. Then all the other ingredients are added, and the whole is digested for about twenty-four hours. The liquid is then filtered, and the eye-water is completed.

The medicine is applied externally to the eye, by means of a feather or camel's-hair brush, and one drop at a time, about three times a day.

Having thus described my invention, what I claim as new, and desire to secure by Letters Patent, is—

A medical compound, consisting of the ingredients in about the proportions set forth.

The above specification of my invention signed by me, this 3d day of July, 1868.

J. ROEMHELD.

Witnesses:
WM. R. TOWNSEND,
CHRISTOPHER STANGE.